US006651880B1

(12) United States Patent
Nakisa

(10) Patent No.: US 6,651,880 B1
(45) Date of Patent: Nov. 25, 2003

(54) DATA PROCESSING APPARATUS INCLUDING AN OUTPUT DISPLAY

(75) Inventor: Ramin C. Nakisa, Little Chalfont (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/250,751

(22) Filed: Feb. 16, 1999

(30) Foreign Application Priority Data

Apr. 17, 1998 (GB) ........................................ 9808024

(51) Int. Cl.[7] ........................................ G06F 17/60

(52) U.S. Cl. ........................ 235/379; 235/380; 902/8

(58) Field of Search ........................ 235/379, 380, 235/382; 902/2, 5, 8, 14, 20; 705/43, 44

(56) References Cited

U.S. PATENT DOCUMENTS

| | | | | |
|---|---|---|---|---|
| 5,071,031 A | * 12/1991 | Yuge et al. | ................ | 235/279 |
| 5,369,415 A | 11/1994 | Richard et al. | | |
| 5,621,424 A | 4/1997 | Shimada et al. | | |
| 5,677,700 A | 10/1997 | Schwalba et al. | | |
| 5,703,637 A | 12/1997 | Miyazaki et al. | | |
| 5,861,614 A | * 1/1999 | Gardner | ...................... | 235/379 |
| 6,164,529 A | * 12/2000 | Peters et al. | ................ | 235/379 |
| 6,205,554 B1 | * 3/2001 | Sasaki et al. | ............... | 713/202 |

FOREIGN PATENT DOCUMENTS

| | | | |
|---|---|---|---|
| EP | 0473343 | 3/1992 | |
| EP | 0712023 | 5/1996 | |
| EP | 0712109 | 5/1996 | |
| EP | 0712110 | 5/1996 | |
| EP | 0802501 | 10/1997 | |
| EP | 0918247 | * 5/1999 | ......... G02F/1/1335 |
| WO | 9409467 | 4/1994 | |
| WO | 9636036 | 11/1996 | |

* cited by examiner

*Primary Examiner*—Daniel St. Cyr
(74) *Attorney, Agent, or Firm*—Gregory A. Welte

(57) ABSTRACT

The present invention relates to data processing apparatus, such as an automatic teller machine, comprising a manual data entry device, a data processor to process information entered by the data entry device and an output display to present output data generated by the data processor. The output display comprises the usual cathode ray tube display and an additional image projector which can be selected to display personal data which it is intended to should remain out of view of a bystander. The image projector includes a pair of light sources adapted to project beams of light focused to a view point within a prescribed field of view in front of the apparatus. Modulating devices modulate the light to convey images of the output data to the view point. The beams of light are focused so as to pass through the pupil of each eye and form images on the retina without the intermediary of a screen. In an alternative embodiment the data processing device may dispense with the cathode ray tube display.

4 Claims, 4 Drawing Sheets

DATA PROCESSING APPARATUS INCLUDING AN OUTPUT DISPLAY

BACKGROUND OF THE INVENTION

The present invention relates to data processing apparatus including an output display which can be viewed by a user of the data processing apparatus and has particular application to data processing apparatus which constitutes an automated teller machine.

In an automated teller machine provision is made for the user to enter information manually through a keyboard and through the entry of magnetically encoded cards. The automatic teller machine includes a data processor which responds to the entry of data so as to enable the user to access financial information and to complete financial transactions such as cash withdrawal. The data processor generates output data to be displayed to a user of the machine so as to enable the user to read financial information and to interact with the machine.

The display device which is in common use for automated teller machines is the cathode ray tube display. Whilst the cathode ray tube provides a satisfactory display of information to the user of the machine, it presents the display to a relatively wide field of view. It is therefore possible for a bystander to see the financial information which is displayed to the user and to intercept personal sensitive financial details of the user. It is not possible to shield the display from a bystander without erecting cumbersome and unsightly barriers to view which would be unwelcome to users of the machine.

A need therefore exists to display output data from a data processing apparatus where the information to be displayed is visible to the user of the machine but is outside the field of view of a bystander.

SUMMARY OF THE INVENTION

According to the present invention there is now provided data processing apparatus comprising a manual data entry means, a data processor to process information entered by the data entry means and an output display to present output data generated by the data processor, the output display comprising a projector including a light source adapted to project a beam of light focused to a view point within a prescribed field of view, and modulating means to modulate the light to convey images of the output data to the view point.

BRIEF DESCRIPTION OF THE DRAWINGS

The invention will now be described, by way of example, with reference to the accompanying drawings in which.

DETAILED DESCRIPTION

Figure 1:
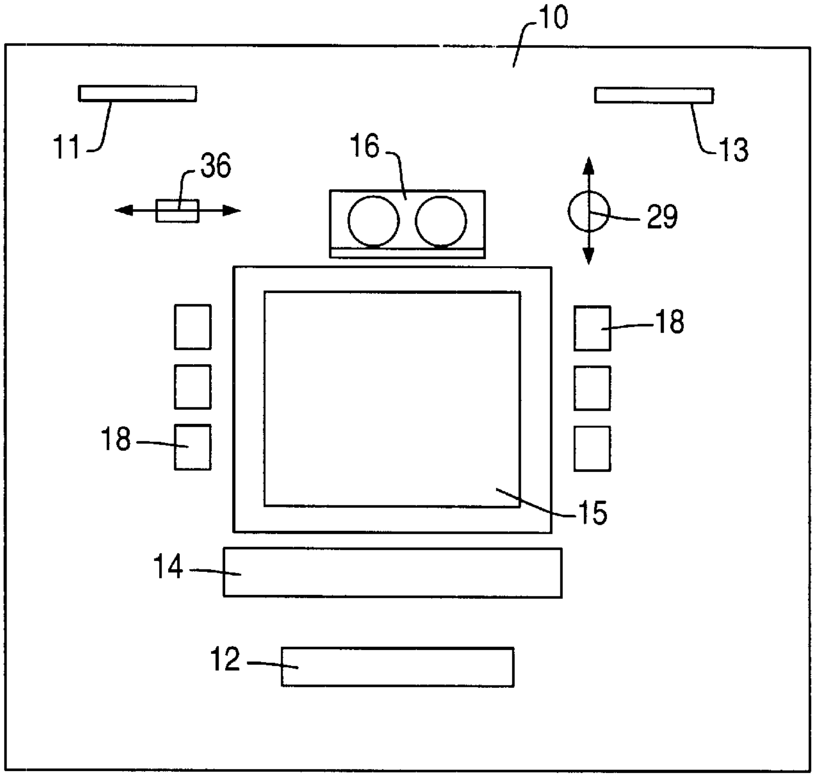
FIGS. 1 and 2 show an automated teller machine embodying the present invention.
Figure 2:
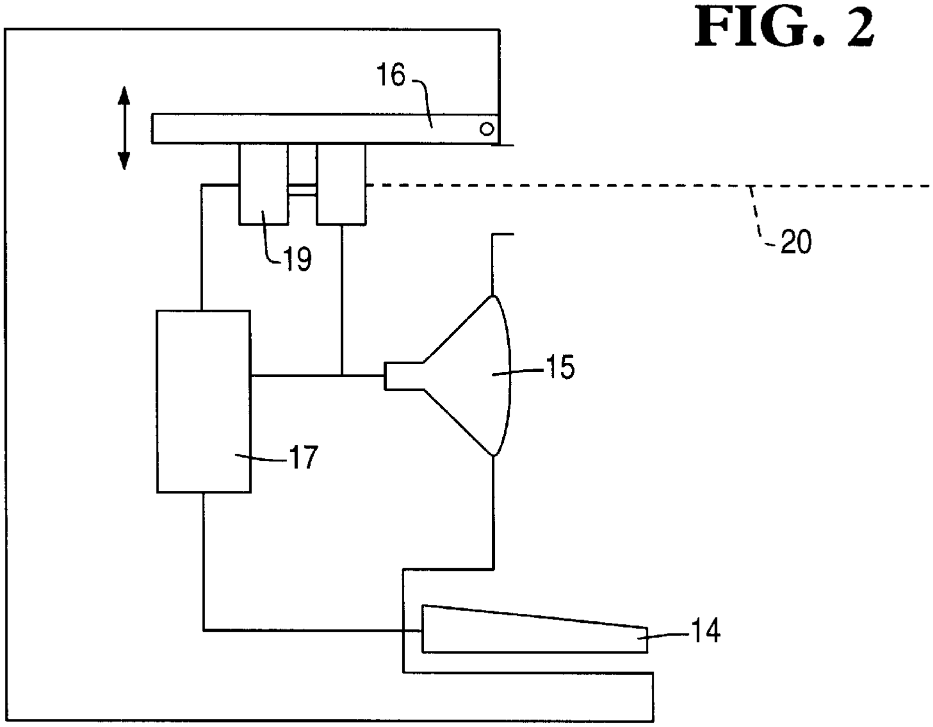

In FIGS. 1 and 2, an automated teller machine 10 has a card receiving slot 11, a cash delivery tray 12, a receipt dispensing slot 13 and a keyboard 14. The machine has a visual display in the form of a cathode ray tube 15 the forward facing screen of which presents a display in well known manner. In addition to the cathode ray tube display 15 the teller machine has an image projector 16. The teller machine has a data processing controller 17 to control the teller machine 10 to operate, in a manner generally familiar to those skilled in the art, to receive a magnetically encoded card in the card slot 11 and thereupon to display on the cathode ray tube display 15 a request for the entry of a PIN number. After entry of the correct PIN number through the keyboard 14, the teller machine displays menus of options available to the user of the machine. The user may opt to receive cash from the delivery tray 12 in an amount entered either through the keyboard or through selection keys 18 located on either side of the display 15 and may opt to receive a receipt from the slot 13. The user may opt to receive financial information, such as the balance in an account, and may opt to receive a printout of the financial information which is supplied through the dispensing slot 13.

Figure 3:
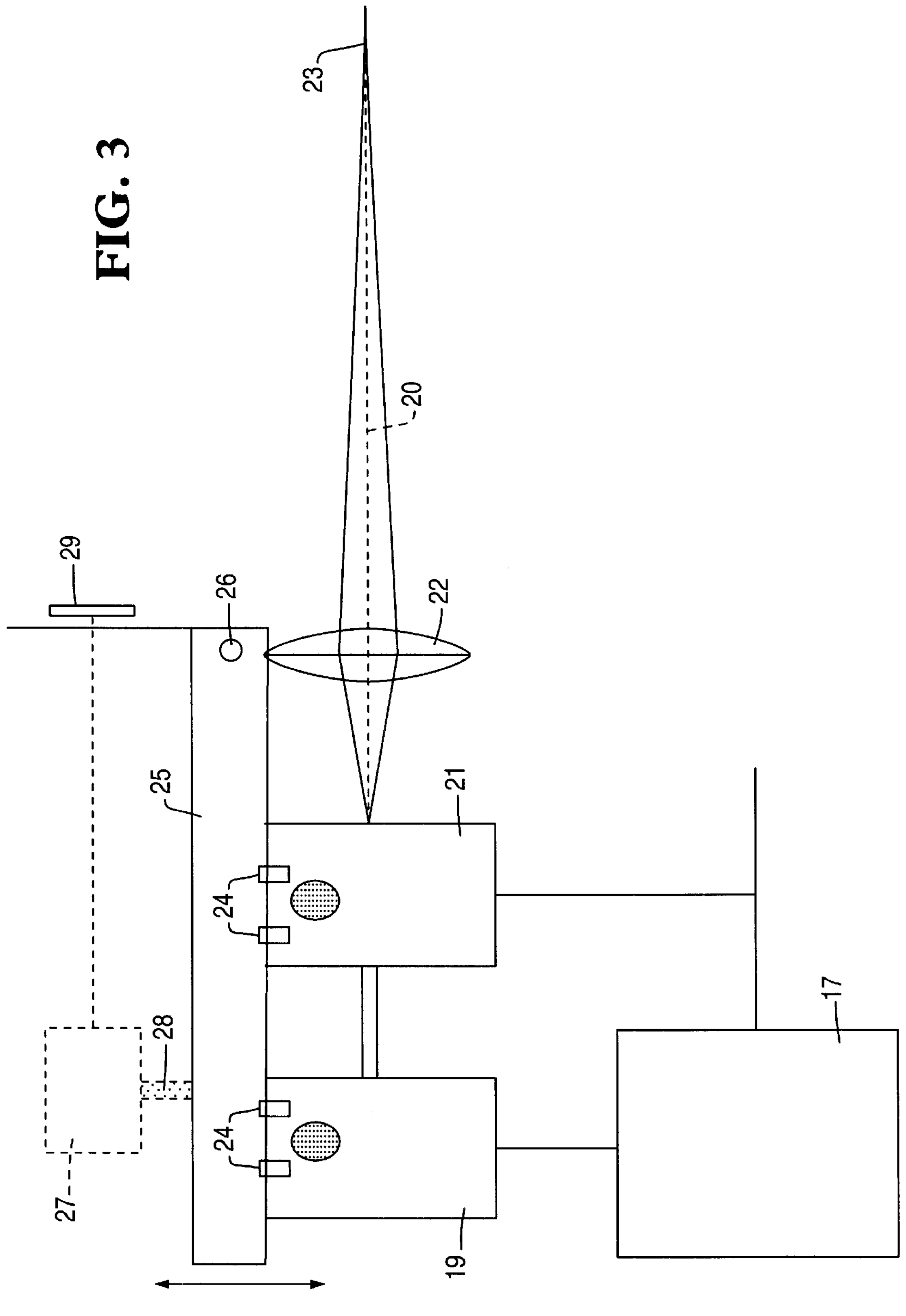
FIGS. 3 and 4 show a display device included in the machine of FIGS. 1 and 2.
Figure 4:
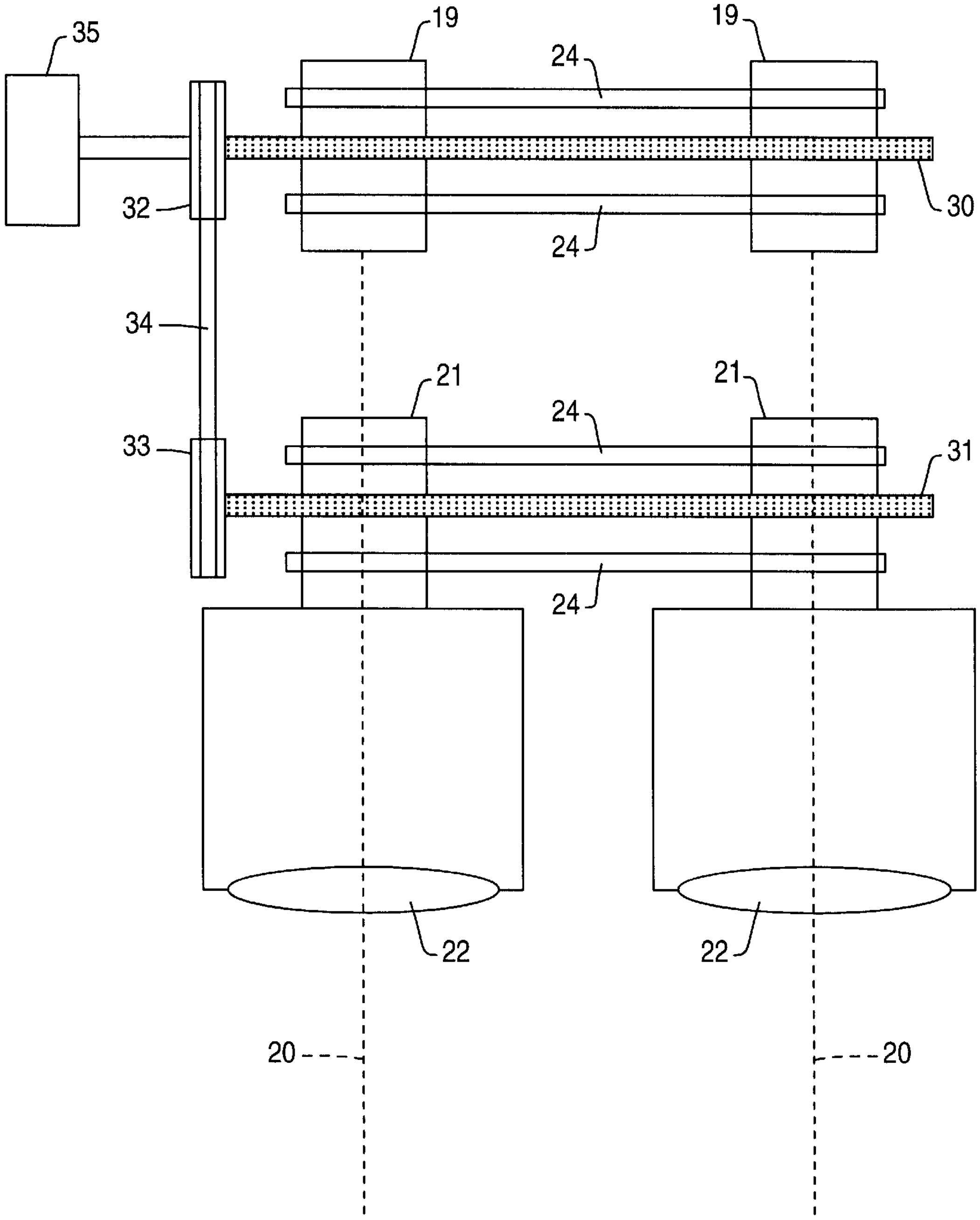

The image projection display 16 is shown in greater detail in FIGS. 3 and 4. As will be seen, the display 16 includes two light sources 19 which project beams of light 20 to respective horizontal and vertical scanners 21. Each light source consists of a laser diode to produce a coherent low intensity beam of light. The scanners 21 pass the beams of light to viewing lens systems 22 which focus the beams of light at focal points 23. The focal points 23 are positioned so that a user may receive light directly through the pupil of each eye and observe an image focused onto each eye retina without the need for an intermediary screen. The data processing controller 17 is connected to supply image data to each of the light sources 19 and to the scanners 21.

The light sources 19 and scanners 21 are mounted by means of rails 24 on a frame 25 which is pivoted at a pivot point 26. The scanners 21 carry the lens systems 22. A reversible motor 27 drives a lead screw 28 by means of which a limited degree of movement can be applied to raise and lower the frame 25 about the pivot point 26 thereby to adjust the vertical height of the focal points 23 of the beams 20. A control button 29 is provided on the front of the teller machine 10 to control the motor 27. Upward movement of the button 29 causes the motor 27 to rotate in a direction to lower the frame 25 about the pivot point 26 and thereby to raise the focal points 23 of the light beams 20. Downward movement of the control button 29 causes the motor 27 to rotate in a direction to raise the frame 25 about the pivot point 26 and thereby lower the focal points 23. Limit switches, not shown are provided to limit the extent of rotation of the leadscrew 28. A user may thus use the button 29 to adjust the light beams to the height necessary to see the images which are projected by the light beams 20.

The light sources 19 are interconnected by a leadscrew 30. The scanners 21 are interconnected by a leadscrew 31. The end of the leadscrew 30 carries a pinion 32 and the end of the leadscrew 31 carries a pinion 33. The pinions 32 and 33 are coupled by a toothed belt 34 to rotate in common. A reversible electric motor 35 has a drive shaft to rotate the pinion 32 and hence the two leadscrews 30 and 31 coupled by the belt 34. A control button 36 is mounted on the front of the teller machine to control the direction of movement of the motor 35. Leftward movement of the control button 36 causes the motor 35 to rotate in a direction so as to drive the leadscrews 30 and 31 to space the light sources 19, scanners 21 and lens systems 22 apart more widely. Rightward movement of the control button 36 causes the motor 35 to rotate in a direction so as to drive the leadscrews 30 and 31 to space the light sources 19, scanners 21 and lens systems 22 apart less widely. A user may thus move the control button 36 to space the light beams 20 at a distance such that an image may be received comfortably by each eye. The extent of movement of the motor 35 is controlled by limit switches and the motor 35 includes an internal gearbox which enables fine control of the spacing of the light beams 20.

Figure 5:
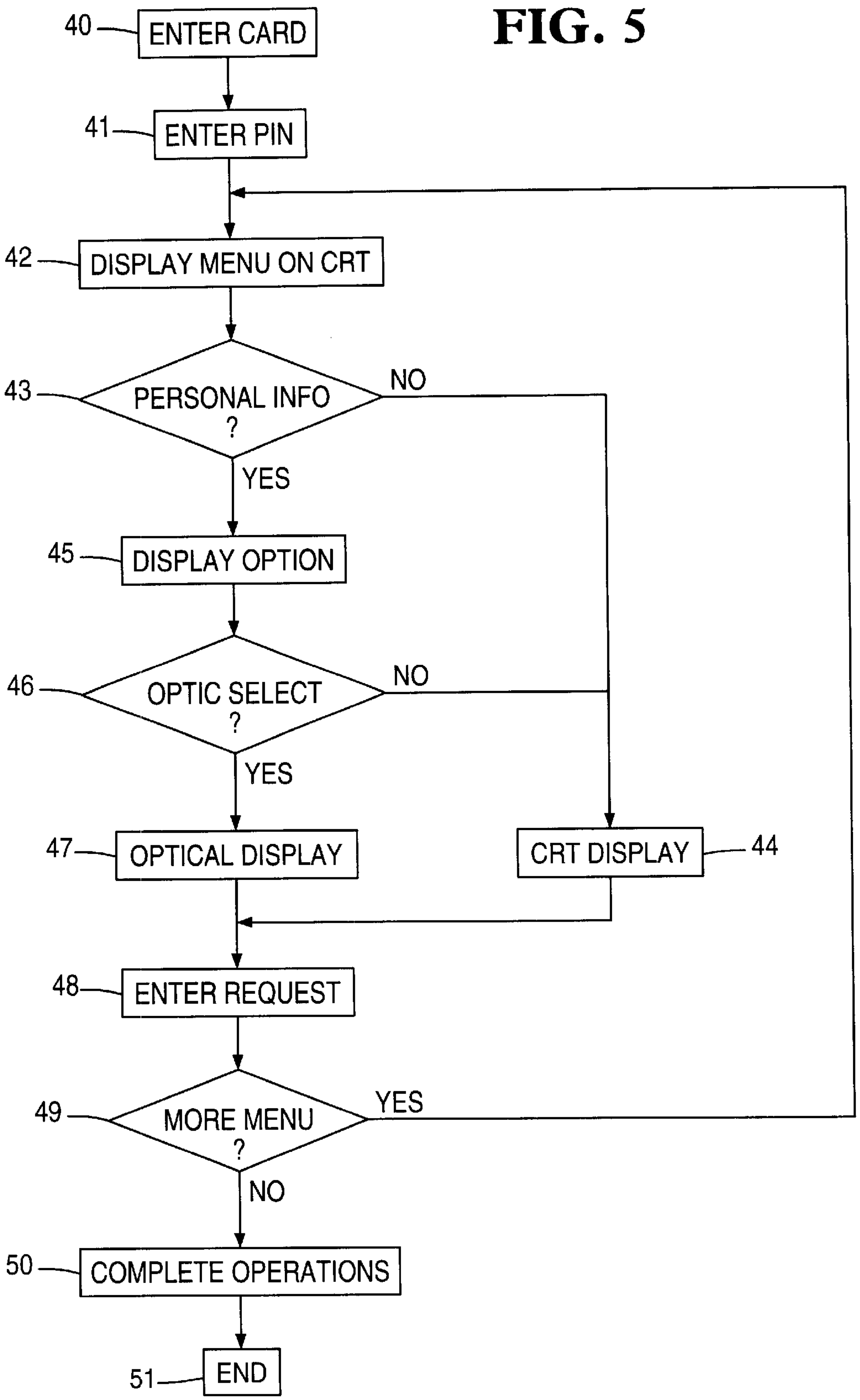
FIG. 5 is a flow diagram explaining the operation of the machine of FIGS. 1 and 2.

The operation of the teller machine is shown diagrammatically in the flow chart of FIG. 5. In a first step 40 a magnetically encoded card is inserted into the card receiving slot 11. Assuming the card is valid for the use of the machine, the data processing controller 17 receives data read from the card and responds in step 41 by sending image data to the cathode ray display 15 requesting the user to insert a PIN number. Upon successful entry of the correct PIN number, the controller 17, in step 42, prepares a menu of options for use of the machine. In step 43 the controller 17 effects a check to determine if there is an option in the menu which includes the display of personal information. If there is no display of personal information, the menu is displayed on the cathode ray tube display 15 in step 44. If the check in step 43 reveals that personal information may be displayed, this fact is displayed on the display 15 in step 45. The user may decide that the information to be revealed is private and should not be revealed to a bystander. In this case the user will select in step 46 to have the information displayed by the image projection display 16. In step 47 the controller 17 will thereupon cause the image projection display 16 to project the required information to the user. The user will be able to adjust the image projection display to the correct height and image beam spacing as already explained so as to make the projected image easily visible.

The user may decide in step 46 that the personal information to be revealed does not need to be concealed from a bystander and in this case may opt to have the information displayed by the display 15.

Following the display of information in either step 44 or step 47, the user may request the next action from the teller machine in step 48. Such a request will be processed by the controller 17 and may result in the need to prepare a further menu of options. A check is made in step 49 to determine if a further menu of options needs to be prepared. In the event of a further menu, the operation returns to the step 42. In the event that no further menu needs to be prepared, the teller machine completes its operations in step 50 and ends the transactions with the user in step 51.

As explained the controller 17 interacts with the user to selectively apply image data to the cathode ray tube display 15 or to the optical image projection display 16. The cathode ray tube display 15 is available as a convenience to the user who can interact with the machine by standing in a position to see the displayed information and to operate the keys of the keyboard 14 and the selection keys 18. When the projection display 16 is selected, each light source 16 projects a beam of light through the iris and on to the retina of each eye of the user. This illuminates a sharply focused spot on each retina. The light sources 19 are arranged to convey a single pixel at a time through the pupil to the retina. The data from the controller 17 is converted to images by modulating the supply of pixels from the light sources and by causing the scanners 21 to scan repeatedly across the retina in a raster pattern. Preferably the scanners consist of an acousto-optical modulator to effect fast horizontal scanning and a galvanometer to effect slower vertical scanning.

By using the two light sources 19 to project the two image bearing beams 20, the user may be shown a high quality video image which appears to be in three dimensions. As an alternative, the automatic teller machine may employ only one light source and one projected light beam rather than two. The result is to simplify the machine and avoid the need for adjustment of the spacing between the beams but in this case the opportunity to project a realistic appearance of a three dimensional image would be lost.

The light sources 19 may each be formed to produce color images by generating red, green and blue light. The red green and blue light in this case is modulated by the controller 17 and merged to produce each pixel in the appropriate viewing color.

What has been described is an automatic teller machine which has a manual data entry means in the form of the keyboard 14 and the selection keys 18, and a data processor including the controller 17 to process user entered information. A projector includes one or more light sources 19 adapted to project a beam of light focused at a view point within a field of view prescribed by the teller machine and adjustable by the user so as to be incident upon the retina of one or both eyes. The controller applies image data to modulate the light so to convey images to the user directly onto the retina of the eye without the intermediary of a screen. The projected images are not visible to a bystander who is out of position to receive the light projected into the eye.

Whilst the invention has been described in the context of an automatic teller machine, it is applicable to any data processing machine where there is a need to restrict the display of information to a prescribed field outside the field of view of a bystander. The invention is applicable to a data processing apparatus in which the cathode ray tube display is replaced by any other equivalent screen display device such as a flat panel liquid crystal display. The invention is also applicable to a data processing machine in which a projected light beam display is the sole means to display information to the user, the cathode ray tube or liquid crystal panel display being dispensed with.

What is claimed is:

1. An apparatus comprising:

manual data entry means;

a data processor for processing information entered by the data entry means;

an output display for presenting output data generated by the data processor, the output display comprising a projector including a light source for projecting a beam of light focused at a view point within a prescribed field of view; and modulating means for modulating light from the light source to convey images of the output data to the view point;

the projector including a second light source for projecting a beam of light focused at another view point within the prescribed field of view, the modulating means including means for modulating light from both light sources.

2. An apparatus according to claim 1, further including spacing adjustment means for adjusting the spacing of the light beams.

3. An automatic teller machine (ATM) for allowing an ATM customer to carry out a cash withdrawal transaction, the ATM comprising:

a cash dispenser for storing cash to be dispensed to an ATM customer carrying out a cash withdrawal transaction;

a card reader for receiving a customer identifying card from an ATM customer to allow the ATM customer to gain access to cash from the cash dispenser;

a customer interface for allowing an ATM customer to enter information to carry out a cash withdrawal transaction;

a controller for processing information entered by an ATM customer via the customer interface;

an output display for presenting output data generated by the controller to be viewed by an ATM customer, the output display comprising a projector including a light source for projecting a beam of light focused at a view point within a prescribed field of view; and modulating means for modulating light from the light source to convey images of the output data to the view point within the prescribed field of view;

the projector including a second light source for projecting a beam of light focused at another view point within the prescribed field of view, the modulating means including means for modulating light from both light sources.

4. An ATM according to claim 3, further including spacing adjustment means for adjusting the spacing of the light beams.

* * * * *